United States Patent Office 2,920,792
Patented Jan. 12, 1960

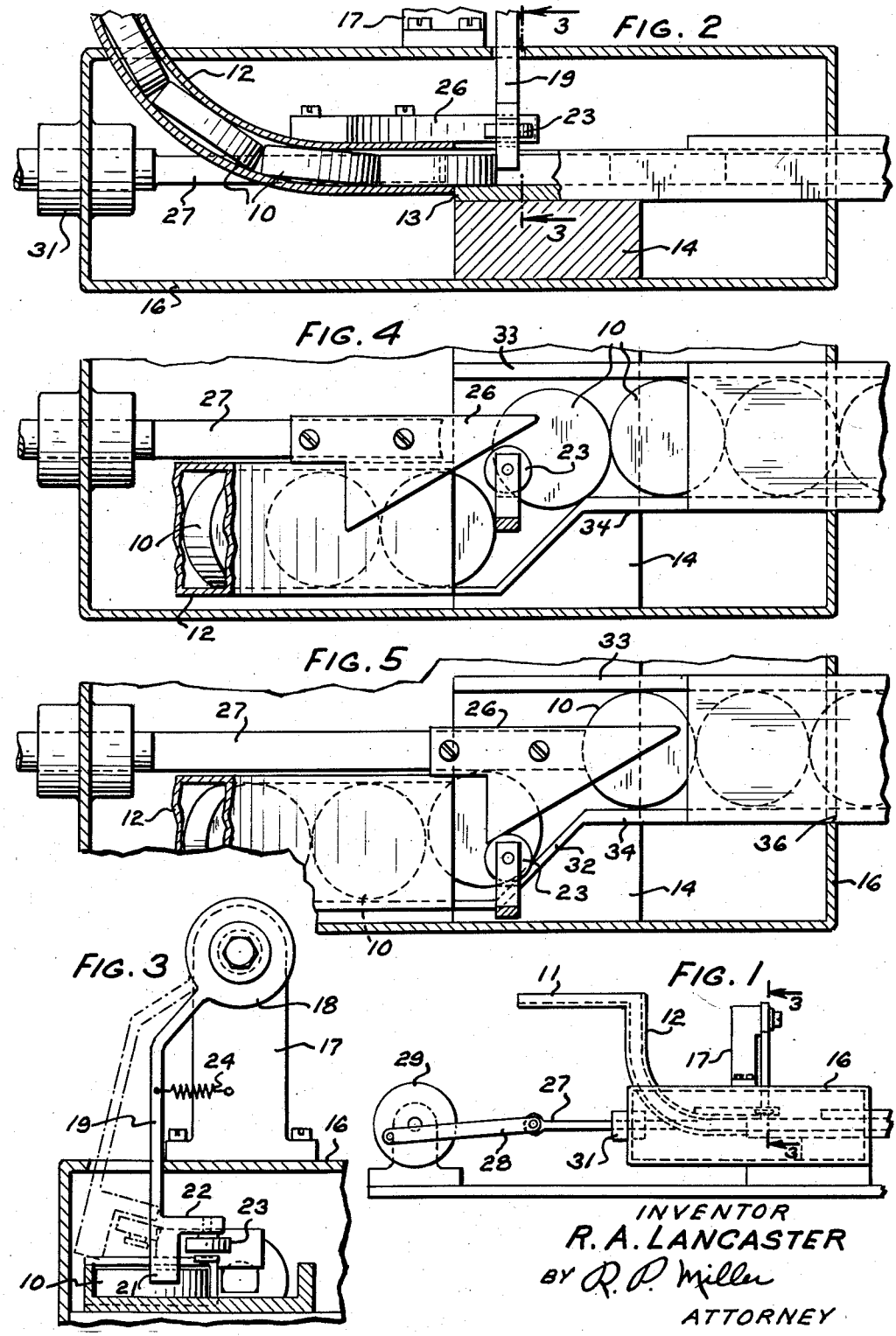

2,920,792

INTERMITTENT ARTICLE FEED APPARATUS

Robert A. Lancaster, Indianapolis, Ind., assignor to Western Electric Company, Incorporated, New York, N.Y., a corporation of New York Application May 7, 1957, Serial No. 657,588

7 Claims. (Cl. 221—238)

This invention relates to intermittent article feed apparatus, and more particularly to a mechanism for positively advancing articles from a gravity chute into a heat-treating furnace.

The present invention is particularly useful in installations where gravity chutes are employed to advance articles into a heat-treating furnace. As the articles are advanced through the heat-treating furnace, it is necessary that the rate of feed be constant otherwise certain of the articles will be subjected to heat for longer periods of time than the remaining articles resulting in non-uniformity of the resulting heat-treated articles. In order that each article remains in the heat-treating furnace for approximately the same period of time, it is a prime requisite that all possibilities of jamming or interference in the article feed mechanism be eliminated.

It is a prime object of the present invention to provide a simple and economical feed apparatus for shifting articles from a gravity feed chute to a position whereat a transfer mechanism moves the articles along a horizontal path.

It is a further object of the invention to provide a feed mechanism having facilities therein for positively moving articles from a gravity feed chute into a position where a reciprocating ram functions to advance the articles along a horizontal path.

Concomitant with the last object, it is an additional object of the invention to provide means for holding the articles in the gravity chute while the transfer mechanism is operated.

With these and other objects in view, the present invention contemplates a gravity feed chute for advancing articles into position to be acted upon by a reciprocating ram. This ram functions to advance the articles one at a time into a heat-treating furnace. A stop mechanism is positioned in the path of the articles being advanced from the gravity chute, and this stop mechanism is adapted to be moved out of position by a cam carried by the reciprocating ram. Spring means are attached to the stop member so that when the ram is in the withdrawn position, the spring means become effective to move the stop means into engagement with and advance an article into position to be acted upon by the next cycle of operation of the reciprocating ram.

Other objects and advantages of the present invention will be apparent from the following detailed description when considered in conjunction with the accompanying drawings, wherein:

Fig. 1 is a side elevational view showing an article feed mechanism embodying the principal features of the present invention;

Fig. 2 is an enlarged side elevational view partly in section showing an inclined chute and a reciprocating plunger for intermittently advancing the articles;

Fig. 3 is a sectional view taken along line 3—3 of Fig. 2 looking in the direction indicated by the arrows illustrating a device for sequentially holding articles in the gravity chute and then advancing articles one at a time to a position in register with the ram;

Fig. 4 is a top plan view partially in section showing the ram in a withdrawn position and the stop device in position to hold the articles in the gravity chute, and Fig. 5 is a top plan view showing the ram in a forward position and the stop device in a withdrawn position to permit movement of the articles in the gravity chute.

Referring to the drawings, there is shown circular disc-like articles 10 that are to be intermittently advanced into a heat-treating furnace. These articles are loaded onto a platform 11 and manually fed into a gravity chute 12. Looking at Fig. 2, the chute 12 is attached to a horizontal plate 13 that is mounted on a block 14 positioned within a housing 16. Secured to the housing 16 is an upwardly extending standard 17 (see Fig. 3) having a hub-like member 18 pivotally mounted thereon. Depending from the hub-like member 18 is an arm 19 having a stop and advancing portion 21 positioned over the plate 13 and in alignment with the center of the terminus of the chute 12. Stop portion 21 functions to alternately hold the articles 10 within the chute and to advance or shift the articles from the chute as will be described subsequently. Laterally extending from the arm 19 is a member 22 having rotatably mounted thereon a cam follower roller 23. A spring 24, secured at one end to the arm 19 and at the other end to the standard 17, is provided to hold the roller 23 in engagement with a cam 26 mounted on a reciprocating plunger or push rod 27 (see Figs. 4 and 5).

Attention is directed again to Fig. 1 wherein the plunger 27 is shown as being pivotally connected to a link 28 pivotally attached to a rotating fly wheel 29. An electric motor or any other suitable drive means may be provided to continuously rotate the fly wheel 29. A bushing 31 is mounted in an aperture formed in the side wall of the housing 16 for the purpose of guiding the plunger 27 to move in a horizontal plane. The forward end of the plunger 27 is arcuate in shape to correspond with the arcuate contour of the articles 10.

An angularly positioned guide rail 32 is mounted on the plate 13 to serve as a guide for the articles being moved in the gravity chute 12 to a position in register with the plunger 27. A pair of guide rails 33 and 34 are attached to the plate 13 to provide a discharge channel that extends through a slot 36 formed in a forward wall of the housing 16.

In operation of the article feed mechanism, the advance of the plunger 27 to the right moves all the articles positioned between the guide rails 33 and 34 toward the heat-treating furnace (not shown). As the plunger 27 moves toward the right, the cam 26 acts on the roller 23 to move the top portion 21 out from engagement with the leading article 10 positioned in the guide chute 12. The articles 10 will move under the action of gravity until the leading article engages the side of the plunger 27 and the guide rail 32 as shown in Fig. 5. In this position the stop portion 21 is now positioned to laterally shift the leading article 10 into register with the plunger 27. Upon withdrawal of the plunger 27 toward the left so that the arcuate terminus thereof clears the leading article 10, the cam 26 is moved to permit the spring 24 to move the stop portion 21 in a counterclockwise direction as viewed in Fig. 3. Inasmuch as the stop portion is positioned in engagement with the leading article 10, this article is moved into alignment with the plunger 27. As soon as the leading article 10 is moved from the position shown in Fig. 5, the remaining articles positioned in the chute 12 will move downwardly a distance equal to approximately the diameter of one article. It will be also noted that as soon as the stop portion 21 starts to move the article 10 into register with the plunger 27, the stop member is positioned to engage the next succeeding article being advanced down the chute 12.

It is to be understood that the above-described arrangements of apparatus and construction of elemental parts are simply illustrative of an application of the principles of the invention and many other modifications may be made without departing from the invention.

What is claimed is:

1. An article feed device comprising a gravity chute, a reciprocating plunger spaced laterally from the lower terminus of the gravity chute, a pivotal mounted member for positively shifting an article from the gravity chute into register with the plunger, and means carried by the plunger for operating said shifting means.

2. In an apparatus for advancing articles, a discharge channel, a feed chute for advancing articles to said discharge channel, a pivotally mounted advancing and stopping member for positively and alternately advancing and precluding advance of articles from said feed chute, a plunger for engaging and moving articles through said discharge channel, means for reciprocating said plunger, and means mounted on said plunger for pivoting the advancing and stopping member to advance an article thereby into the path of said plunger.

3. An intermittent article feed apparatus which comprises a reciprocating horizontal plunger, a gravity chute for advancing articles down an incline into a position that is laterally offset from the plunger, means for guiding articles from said laterally offset position to a position in register with the plunger, a stop member positioned in the path of said chute to positively hold the articles therein, means carried by the plunger for moving said stop member to permit an article to move into lateral alignment therewith, and means rendered effective by the withdrawal of said plunger for moving said stop member to advance an article along said guide means into register with said plunger.

4. In an apparatus for intermittently advancing articles, a gravity chute for advancing articles, a reciprocating plunger, a guide rail for guiding articles from the gravity chute in a position in register with the plunger, means for positively holding the articles in the chute from movement into engagement with the guide rail, means actuated by a forward movement of the plunger for moving said holding means to permit an article to advance into engagement with said guide rail, and means for moving said holding means to move said advanced article along said guide rail into register with said plunger.

5. An intermittent article feed apparatus, which comprises a curved gravity chute to feed articles into a horizontal position, a deflecting guide rail rigidly mounted on said gravity chute to horizontally deflect articles leaving said chute, a discharge channel attached to said rail to receive an article deflected from the gravity chute by the guide rail, a reciprocating plunger having an article complementing surface to engage and move articles in said discharge channel, a pivotally mounted article stop and transfer member, means for biasing said member to a position lateral to the path of an article leaving the gravity chute and towards the path of the discharge channel, a cam follower rigidly mounted on said stop, and an inclined cam surface secured to said plunger and engaging said follower to laterally reciprocate said stop and transfer member against the bias means to alternately stop and feed an article between the terminus of the gravity chute and the path of the discharge channel.

6. In a device for advancing articles step-by-step, a discharge channel, a gravity feed chute offset from said channel adapted to feed articles, a plunger movably mounted in register with said discharge channel, means for reciprocating said plunger to advance an article in said discharge channel and block the advance of the remainder of the articles in said gravity chute, and a pivotally mounted member actuated by the retraction of the plunger for positively shifting an article from said gravity feed chute into position to be advanced by said plunger.

7. An intermittent article feed apparatus which comprises a reciprocating horizontal push rod, a gravity chute for supplying articles to a position adjacent the horizontal push rod, a spring-urged stop means positioned in the path of articles in the gravity chute for holding the articles in said gravity chute adjacent the push rod, and means carried by the push rod for alternately moving said stop means to permit the advance of an article into engagement with the side of the push rod and to release the spring-urged stop means to positively advance the article into register with the push rod.

References Cited in the file of this patent

UNITED STATES PATENTS

| 972,649 | Rose | Oct. 11, 1910 |
| 1,116,849 | Sasseman | Nov. 10, 1914 |